United States Patent [19]

Hasegawa et al.

[11] 4,369,238

[45] Jan. 18, 1983

[54] STORAGE BATTERY SEPARATOR

[75] Inventors: Takao Hasegawa; Wataru Takahashi, both of Gifu, Japan

[73] Assignee: Nihon Mukiseni Kogyo Kabushiki Kaisha, Tokyo, Japan

[21] Appl. No.: 225,104

[22] Filed: Jan. 14, 1981

[30] Foreign Application Priority Data

Jan. 16, 1980 [JP] Japan ................................ 55-2608

[51] Int. Cl.³ ............................................. H01M 2/16
[52] U.S. Cl. .................................... 429/252; 429/253
[58] Field of Search ............................... 429/251–253; 162/165; 524/509

[56] References Cited

U.S. PATENT DOCUMENTS

| | | | |
|---|---|---|---|
| 3,161,547 | 12/1964 | Beaulieu | 429/253 |
| 3,351,495 | 11/1967 | Larsen et al. | 429/252 |
| 3,475,355 | 10/1969 | Decker | 429/253 X |
| 3,650,102 | 3/1972 | Economy et al. | 429/229 |
| 3,926,679 | 12/1975 | Jones | 429/253 |

*Primary Examiner*—Anthony Skapars
*Attorney, Agent, or Firm*—Armstrong, Nikaido, Marmelstein & Kubovcik

[57] ABSTRACT

A storage battery separator comprising a phenol resin, polyolefin resin and inorganic powder, showing restraint of battery over charging and reduced brittleness, is described.

4 Claims, No Drawings

STORAGE BATTERY SEPARATOR

BACKGROUND OF THE INVENTION

The present invention relates to a storage battery separator characterized in that the same comprises a mixture of phenol resin, polyolefin resin and inorganic powder, and containing the phenol resin 2-50% based on the mixture.

The phenol resin in the storage battery separator is one or more selected from a novolak type, a resol type and a modified resin of these types.

The polyolefin resin of said storage battery separator is one or more selected from polyethylene, polypropylene, polybutylene, copolymers thereof and a polymer blend thereof with a weight average molecular weight thereof of 50,000 or more, in a ratio to the mixture of 10-60% by weight.

The inorganic powder of said storage battery separator is one more selected from silica, silicate such as calcium silicate, alumina, calcium carbonate, kaolin, talc, diatomaceous earth, carbon black, glass fibrous powder etc., in a ratio of 35-70% by weight to the mixture.

The storage battery separator may be made by mixing a phenol resin in the amount of 2-50% by weight, polyolefin resin in the amount of 10-60% by weight and inorganic powder in the amount of 35-85% by weight and the resultant composite of 100 parts, and an organic liquid of 50-200 parts are then mixed, and the resultant mixture is molded to form a sheet, and the organic liquid is extracted from the sheet, and said sheet is then dried.

In said process of manufacturing a storage battery separator the phenol resin may be used in the form of a powder.

DETAILED EXPLANATION OF INVENTION

This invention relates to an improvement in a storage battery separator of the type that the same comprises a mixture of polyolefin resin and inorganic powder, and is particularly directed to an improvement in the same in view of a preventive measure for restraining a battery from overcharging.

It is usual that a storage battery for a motorcar is subjected to a constant-voltage charging by means of an electric generator provided on the motorcar during running thereof, and, recently, it has often happened that the battery is overcharged thereby as a result of a longer charging time with a longer running distance of the motorcar, so that the battery is shortened in its life by such an overcharge, especially in proportion to increase in an amount of the overcharge (A.H.). In the case of a constant-voltage charging, the higher the charging final voltage is, the harder it is for the battery to be overcharged and the less overcharge amount is resulted. However, it is usual with a lead-acid storage battery that a lead-base alloy containing 2-5% of antimony is used as electrode plates, and, during the use of the battery part of the antimony content is dissolved from the positive plate and migrates to and is deposited on the surface of the negative plate grid, and the negative potential becomes lower because it is moved toward the noble side by the deposited antimony, and consequently the battery charging final voltage between the positive and negative potentials is lowered and the overcharge amount by the constant-voltage charging is increased.

The prior art shows a storage battery separator comprising polyolefin resin and inorganic powder as disclosed in U.S. Pat. No. 3,351,495 specification etc., but this separator has no effect in reducing the overcharging which would result in a lower overcharge amount, and has a high degree of brittleness caused by the oxidation resistant test.

Further, the prior art has shown a reinforced pulp fiber separator which is prepared by reinforcing a pulp fiber type separator with phenol resin, but this separator is insufficient in regard to the oxidation resisting property, so that its life of use is comparatively short and is not capable of restraining the overcharge to result in a smaller charging amount, and also becomes very brittle by the oxidation resisting test.

The present invention has for an objective to provide a storage battery separator which does not have the foregoing defects, and it is characterized in that said storage battery separator comprises a mixture of phenol resin, polyolefin resin and an inorganic powder, and containing the phenol resin in the amount of 2-50% based on the mixture.

Thus, according to this invention combining the phenol resin with the polyolefin resin and the inorganic powder, there can be now realized such a separator that is decreased in brittleness after the oxidation resisting test, improved in oxidation resisting property, restrains the overcharging of a battery to decrease the charging amount and elongates the life of the battery.

The battery separator of this invention is manufactured by the following process.

Namely, the phenol resin to be used is one or more of a novolak type, a resol type and any kind of modified type such as epoxy resin modified, rubber modified, or the like. The phenol resin is used in the form of a liquid or preferably in the form of powder. The amount thereof is in the range of 2-50% by weight based on the mixture. The phenol resin of 2-50% by weight, the polyolefin resin of 10-60% by weight and the inorganic powder of 35-85% by weight are mixed together, and the resultant composite or mixture of 100 parts, and an organic liquid of 50-200 parts are mixed together by a conventional common mixer, and the resultant mixture is extrusion-molded, by using an extruder, into a sheet or is film formed. The molded composition thus obtained is treated with a solvent such as water or organic solvent for extracting therefrom the contained organic liquid, and thereafter the resultant sheet is dried and is then cut into a predetermined size so as to obtain the microporous separator of this invention.

Further, in this process, a stabilizer or antioxidant such as BHT (butylated hydroxytoluene) or the like, for preventing thermal and oxidative degradation of the polyolefin may be mixed in the mixture at the time of mixing of the three components.

Furthermore, the separator may be treated with a penetrant or wetting agent such as anionic sodium dialkyl sulfosuccinate, nonionic polyethylene glycol alkylether or other active surface agent, or the like. The penetrant or wetting agent may be added to the mixture at the time of mixing of the three components, or is impregnated into the separator obtained after the procedure for extracting the organic liquid therefrom, so that there is produced the separator with the wetting agent uniformly adhered thereto.

As for the polyolefin resin, there is used polyethylene, polypropylene, polybutylene, a copolymer thereof such as ethylenepropylene copolymer or the like, a polyblend of one or more of the above polymers.

Among the polyolefins any desired one is used with a weight average molecular weight in the range of 50,000–3,000,000 (measured by solution viscosity method), a number average molecular weight of 5,000 or more (G.P.C. method) and an MI (melt index) in the range of 0–10 (JIS K-6760). A polyolefin with a M.W. of 100,000 or more is preferably used in view of strength of the separator to be produced. The amount thereof which is added is preferably in the ratio of about 10–60% by weight to the mixture comprising the three components in view of the strength and the electric resisting property of the separator to be produced.

As for the inorganic powder, there is used one or more selected from silica, silicate such as calcium silicate or the like, alumina, calcium carbonate, kaolin, talc, diatomaceous earth, carbon black, glass fiber powder and any other like commercially available inorganic powders. The addition amount thereof is in the range of 35–70% by weight to the total amount of the three component mixture in view of the oxidation resisting property, electric resistance, brittleness or the like.

As for the organic liquid, there is preferably used one or more kinds of organic liquid, such as mineral oil, of such a character that the same is fluid at the melting-molding procedure and can be dissolved in a solvent such as water or organic solvent such as kerosene, trichlorethylene, methanol, methyl acetate, etc.

The advantageous effects caused by this invention characterized in that the phenol resin of 2–50 wt.% is mixed in the polyolefin resin and the inorganic powder will be clarified by the following examples together with control examples.

EXAMPLE 1

A novolak type phenol resin in powder form (CRM-0909, SUG product) which has a softening temperature of 95° C. (ring and ball method) and particle size of 200 meshes, a high density polyethylene which has 100,000 in weight average molecular weight, 0.06 g/10 minutes in MI and 2.6 in intrinsic viscosity, and silica powder of 16 m$\mu$ in an average particle size are mixed by varying the respective ratios as shown in Table 1, and to the weight of each of the resultant mixtures 130% by weight of mineral oil which has 0.88 in specific gravity and 7.8 in solubility parameter is added and is mixed together by a henshel mixer at a rotation speed of 400 r.p.m. for five minutes, and the resultant mixture is extrusion-molded by a double screw shaft type extruder with a T-shaped die having a 300 mm width, at a rotation speed of 20 r.p.m. at 180° C. into a sheet of 0.3 mm in thickness, and the sheet thus obtained is treated with an organic solvent (60° C. at liquid temperature) such as trichlorethylene contained in a supersonic washing apparatus, for one minute and at a frequency of 28 KH$_z$, so that extraction of the mineral oil is carried out, and then the sheet thus treated is dried. Thus microporous separators of various compositions varied from A-G shown in Table 1 can be produced.

EXAMPLE 2

Except for that as for the phenol resin, a resol type in the form of a powder (CKM-1634, SUG product) which has a softening temperature of 100° C. and is 200 mesh in particle size and, as for the polyolefin resin, a high density polyethylene of a weight average molecular weight of 1,000,000, 0 g/10 minutes of MI and 11 of intrinsic viscosity are used, substantially the same process as the example 1 is carried out to produce a microporous separator of this invention as shown in Table 1.

CONTROL EXAMPLE 1

Without using phenol resin, the same high density polyethylene of 40% by weight as used in the example 1 and the same silica powder of 60% by weight as used in the example 1 are mixed together, and the other procedures are substantially the same as those carried out in the example 1, to produce a microporous separator for control.

CONTROL EXAMPLE 2

A high density polyethylene of a weight average molecular weight of 900,000, a number average molecular weight of 20,000 and silica powder of an average particle size of 16 m$\mu$ are mixed in the ratio of 35 to 60% by weight, and the other procedures are carried out substantially in the same manner as those of the example 1, and the separator thus produced is further soaked in trichlorethylene solution of naphthenic process oil 4 wt.%, and, after the amount of the naphthenic process oil adhering to the separator reaches 5 wt.% to the separator, the separator is taken out and dried, and thus the separator treated with the process oil is produced.

CONTROL EXAMPLE 3

A high density polyethylene having a weight average molecular weight of 100,000, silica powder of 16 m$\mu$ particle size and an antioxidant of 4, 4-thiobis-(6-tert-butyl-m-cresol) are mixed in the ratio of 35:64.5:0.5 by weight, respectively, and the remainder procedures are substantially the same carried out in the example 1, to produce a microporous separator.

The respective above separators thus produced are assembled with electrode plate grids each comprising a lead-base alloy containing 4.5 wt. % antimoney in the conventional manner for producing respective 2-V lead-acid batteries, and for each of those batteries a constant-voltage charging test is carried out in its use condition. The test results are shown in the following Table 1.

TABLE 1

|  |  | Phenol resin wt % | Polyethylene wt % | Silica Powder wt % | Negative plate potential V | Final Voltage of charging V |
|---|---|---|---|---|---|---|
| Example 1 | A | 2 | 38 | 60 | −0.08 | 2.53 |
|  | B | 5 | 35 | 60 | −0.15 | 2.60 |
|  | C | 10 | 30 | 60 | −0.20 | 2.65 |
|  | D | 20 | 15 | 65 | −0.22 | 2.67 |
|  | E | 30 | 20 | 50 | −0.22 | 2.67 |
|  | F | 20 | 10 | 70 | −0.22 | 2.67 |
|  | G | 50 | 10 | 40 | −0.22 | 2.67 |
| Example 2 |  | 10 | 30 | 60 | −0.22 | 2.67 |

TABLE 1-continued

|  | Phenol resin wt % | Polyethylene wt % | Silica Powder wt % | Negative plate potential V | Final Voltage of charging V |
|---|---|---|---|---|---|
| Control Example 1 | 0 | 40 | 60 | −0.05 | 2.50 |
| Control Example 2 | 0 | 35 | 60 | −0.05 | 2.50 |
| Control Example 3 | 0 | 35 | 64.5 | −0.05 | 2.50 |

As clear from the above Table, the addition of the phenol resin to the mixture of polyolefin and the inorganic powder according to this invention can provide such advantageous effects that the negative electrode potential can be kept higher, and the final voltage of charging can be heightened, so that the overcharging caused by the charging procedure can be restrained to a small amount and a longer battery life of can be obtained in comparison with the control separators.

As a result of many experiements and research, it is found that the amount of the phenol resin to be added must be the range of substantially 5–50wt.% to the mixture of the three components essentially comprising this invention separator, and if the addition amount thereof is added below 5% it cannot heighten the final voltage of charging of the battery, and on the other hand the addition amount of about 50 wt.% thereof results in brittleness of the separator so that it becomes impractical.

In addition, according to this invention, it must be noted that it is found that the brittleness of the separator after being subjected to the oxidation resistance test can be improved by combining the addition of the phenol resin in the range of 2–50% by weight with the two components of the polyolefin resin and the inorganic powder as will be clear hereafter.

Namely, as mentioned before, it is found that the reinforced pulp fibrous type separator becomes very brittle after undergoing the oxidation resistance test. Further, it is also found that the higher the molecular weight of polyolefin resin is the higher the oxidation resisting property of the separator is, but when the phenol resin is added thereto it results in such an advantageous effect that even in the case where the polyolefin resin of below 300,000 of the weight average molecular weight and below 15,000 of the number weight average molecular weight is used for making the separator there can be obtained an excellent separator which is high in the oxidation resisting property and strong in bending strength after the oxidation resistance test.

Next, the results of the comparison tests on the bend resisting property after the oxidation resisting test and other properties for comparison of this invention separator with the control separators are shown in the following Table 2.

TABLE 2

|  | Bending strength, times of bending after 200 hrs. of oxidation resisting test | | Electric resistence Ω/dm²/sheet | Tensile strength kg/mm² | Elongation % | Average pore size μ | Porosity % |
|---|---|---|---|---|---|---|---|
| Example 1 | A | 63 | 0.0008 | 0.4 | 210 | 0.06 | 55 |
| Example 1 | B | 136 | 0.0008 | 0.4 | 200 | 0.06 | 55 |
| Control Example 1 | | 2 | 0.0008 | 0.4 | 200 | 0.06 | 54 |
| Control Example 2 | | 4 | 0.0012 | 0.3 | 170 | 0.06 | 54 |
| Control Example 3 | | 4 | 0.0009 | 0.4 | 190 | 0.06 | 55 |

Thus, it is clear from Table 2, above, that even by the addition amount of phenol resin at least 2% by weight the bending strength property of the battery separators of this invention is much improved as compared with conventional separators. As a result of many experiements and research, it has been confirmed that substantially below 2 wt.% of the amount of phenol resin to be added hardly has the effect on the improvement in the bending strength property of the separator.

The various properties noted above were tested to establish the respective values thereof by the following methods:

The negative electrode potential—the potential between the negative electrode plate and a cadmium electrode plate of the battery is measured by a voltmeter at the final time of the charging.

The voltage of the final

Charging time—the voltage between the positive electrode terminal and the negative electrode terminal of the battery is measured by a voltmeter when the rising in the voltage therebetween caused by the charging has come to stop.

Bending strength—JIS P 8115

Electric resistance—JIS C 2313

Tensile strength—JIS C 2313

Elongation—Elongation is measured when the separator is broken when the tensile strength is being measured.

Average particle size—Mercury intrusion method

Porosity—Mercury intrusion method

Oxidation resisting property—JRS 37506 -IE-15AR7A

Thus, according to this invention, a battery separator which comprises the combination of phenol resin of substantially 2–50% by weight with polyolefin resin and inorganic powder, so as to achieve advantageous effects such that the overcharging by a constant-voltage charging into the battery can be restrained and the brittleness of the separator after undergoing the oxidation resistance test can be improved and life of the battery can be extended.

What we claim is:

1. A storage battery separator comprising a mixture of phenol resin, polyolefin resin and inorganic powder, and containing the phenol resin of 2–50% based on the mixture.

2. A storage battery separator according to claim 1, wherein the phenol resin is one or more selected from a novolak type, a resol type or a modified novolak or resol type pheonol resin.

3. A storage battery separator according to claim 1, wherein the polyolefin resin is one or more selected from polyethylene, polypropylene, polybutylene, co-polymers thereof and a polymer blend thereof with a weight average molecular weight thereof of 50,000 or more, in a ratio to the mixture of 10–60% by weight.

4. A storage battery separator according to claim 1, wherein the inorganic powder is one or more selected from silica, silicate such as calcium silicate, alumina, calcium carbonate, kaolin, talc, diatomaceous earth, carbon black, glass fibrous powder etc., in a ratio of 35–70% by weight to the mixture.

* * * * *